(12) United States Patent
Peng (10) Patent No.: US 12,289,005 B1
(45) Date of Patent: Apr. 29, 2025

(54) MULTIFUNCTIONAL AND ROTATABLE CHARGING DOCK

(71) Applicant: Rong Peng, Yichun (CN)

(72) Inventor: Rong Peng, Yichun (CN)

( * ) Notice: Subject to any disclaimer, the term of this patent is extended or adjusted under 35 U.S.C. 154(b) by 0 days.

(21) Appl. No.: 19/018,320

(22) Filed: Jan. 13, 2025

(51) Int. Cl.
*H01M 10/46* (2006.01)
*H02J 7/00* (2006.01)

(52) U.S. Cl.
CPC ................... *H02J 7/0044* (2013.01)

(58) Field of Classification Search
CPC ....... H02J 7/0044; H02J 7/0042; H02J 50/005
USPC ................... 320/107, 108, 114, 115
See application file for complete search history.

(56) References Cited

U.S. PATENT DOCUMENTS

| | | | | |
|---|---|---|---|---|
| 10,879,723 | B2 * | 12/2020 | Morrow | H02J 7/0013 |
| 2015/0196151 | A1 * | 7/2015 | Phipps | A47G 29/08 211/85.2 |
| 2022/0069600 | A1 * | 3/2022 | Patel | H02J 7/0045 |

FOREIGN PATENT DOCUMENTS

| | | | | | |
|---|---|---|---|---|---|
| CN | 111478393 | A | * | 7/2020 | |
| CN | 112234664 | A | * | 1/2021 | H02J 50/12 |
| CN | 117639173 | A | * | 3/2024 | |
| CN | 220775447 | U | * | 4/2024 | H02J 50/005 |
| CN | 118412955 | A | * | 7/2024 | |
| CN | 221263433 | U | * | 7/2024 | |
| JP | 3236689 | U | * | 3/2022 | |

OTHER PUBLICATIONS

Machine translate of CN221523433U (Jul. 2, 2024) (Year: 2024).*

* cited by examiner

*Primary Examiner* — Edward Tso
(74) *Attorney, Agent, or Firm* — Birchwood IP (57) ABSTRACT

A multifunctional and rotatable charging dock is provided, which includes a mobile phone charging dock, a watch charging dock, an earphone charging dock, and a common component. The mobile phone charging dock is provided on a top of the common component and can be rotated to achieve wireless charging a mobile phone; the watch charging dock and the earphone charging dock are placed on two sides of the common component for charging the watch and earphones. The common component includes a middle shell, a decoration piece, a main PCB, a counterweight block, a light guide piece, and a bottom cover. The mobile phone charging dock has components such as a lens, a magnet, a coil, etc., and a motor controls its rotation. The watch charging dock can be opened and closed by rotating a shaft, and the earphone charging dock can be turned outward by 90 degrees.

8 Claims, 7 Drawing Sheets

MULTIFUNCTIONAL AND ROTATABLE CHARGING DOCK

TECHNICAL FIELD

The present disclosure relates to the field of charging dock technologies, and in particular, to a multifunctional and rotatable charging dock.

BACKGROUND

With the popularity of electronic devices, people usually have various devices that require charging, such as mobile phones, watches, and Bluetooth earphones. However, traditional charging ways often require the use of multiple different chargers, which not only leads to many charging devices and occupies space, but also requires frequent plugging and unplugging of different chargers during use, thereby causing inconvenience to users.

In addition, some existing charging devices, although equipped with multiple charging interfaces, lack integrity and convenience in their design, which cannot meet users' needs for simple and efficient charging solutions. For example, some charging docks may simply integrate multiple charging interfaces together without considering charging characteristics and use habits of different devices, nor providing dedicated charging areas and ways for different devices.

In this specification, developing a multifunctional charging dock that can simultaneously meet needs of charging multiple electronic devices and has characteristics of convenience, efficiency, and integration has become an urgent problem that technical personnel in this field need to solve.

SUMMARY

The purpose of the present disclosure is to provide a multifunctional and rotatable charging dock, aimed at solving the problems existing in the background technology. To achieve the objectives, the technical solution adopted by the present disclosure is as following.

A multifunctional and rotatable charging dock, including a mobile phone charging dock, a watch charging dock, an earphone charging dock, and a common component; where the mobile phone charging dock is provided on a top of the common component and is capable of being rotated 180° or 360° on the common component; the mobile phone charging dock is configured to wireless charge a mobile phone; left and right sides of the common component are respectively provided with the watch charging dock and the earphone charging dock; the watch charging dock is configured to charge a watch, and the earphone charging dock is configured to charge Bluetooth.

In some embodiments of the present disclosure, the common component includes a middle shell, a middle shell decoration piece, a main PCB, a counterweight block, a light guide piece, and a bottom cover; an outer side of the middle shell is provided with the middle shell decoration piece, a bottom of the middle shell is provided with the main PCB, the counterweight block is provided on the middle shell through the light guide piece, an outer side of the counterweight block is connected to the bottom cover; left and right sides of the middle shell are respectively connected to the earphone charging dock and the watch charging dock.

In some embodiments of the present disclosure, a rubber pad is further provided on the bottom cover.

In some embodiments of the present disclosure, the mobile phone charging dock includes a lens, a magnet, a coil, a mobile phone charging outer shell, a PCB touch control chip, a turntable upper shell, a turntable lower shell, a turntable pressing piece, and a motor; the PCB touch control chip is provided inside the mobile phone charging outer shell, and the lens is provided on a top of the mobile phone charging outer shell; the magnet is provided between the lens and the mobile phone charging outer shell, and the coil is provided inside the magnet; a bottom plate of the mobile phone charging outer shell is connected to the turntable upper shell, a center position of the turntable lower shell is connected to the turntable pressing piece; the turntable lower shell is connected to the turntable upper shell through the turntable pressing piece; the turntable pressing piece is connected to the motor, and the motor is configured to control the mobile phone charging dock to rotate; the magnet and the coil are configured to charge the mobile phone.

In some embodiments of the present disclosure, the watch charging dock includes a watch module fixing piece, a watch module rotating shaft, a watch charging bottom cover, a watch charging outer shell, and a watch coil; the watch module fixing piece is provided on a right side of the middle shell, the watch charging bottom cover is provided on an outer side of the watch module fixing piece, and the watch module rotating shaft is provided on a left inner side of the watch module fixing piece, the watch module rotating shaft passes through the watch module fixing piece and is connected to the middle shell, the rotating shaft is configured for an overall rotation of the watch charging dock to open and close, the watch coil is provided on the watch charging bottom cover, and the watch coil is configured to charge the watch; an outer side of the watch coil is provided with the watch charging outer shell In some embodiments of the present disclosure, the earphone charging dock includes an earphone module fixing piece, an earphone magnet, an earphone charging face cover, an earphone coil, and an earphone charging outer shell; the earphone charging face cover is provided on the light guide piece through the earphone module fixing piece, and the earphone magnet is provided on the middle shell; an outer side of the earphone charging face cover is provided with the earphone coil, and an outer side of the earphone coil is provided with the earphone charging outer shell; the earphone charging face cover, the earphone coil, and the earphone charging outer shell are integrated; the earphone charging face cover, the earphone coil, and the earphone charging outer shell are capable of being rotated outward 90 degrees on the earphone module fixing piece.

In some embodiments of the present disclosure, the earphone charging outer shell and the watch charging outer shell are provided with recesses, and the recesses are convenient to be opened and used.

In some embodiments of the present disclosure, a charging socket is further provided on the main PCB, and the charging socket is configured to connect a charging cable.

The beneficial effects of the present disclosure are as following.

Multi-functional are integrated, space is saved, and it is convenient charging: mobile phone, watch, and earphone charging functions are integrated, one charging dock meets needs of charging multiple devices, thereby reducing the number of desktop charging devices and saving space. A user does not need multiple chargers or occupy multiple sockets, therefore solving a problem of messy charging cables for multiple devices, rendering the charging area cleaner, and providing a convenient charging experience.

Rotating design enhances flexibility and convenience. The mobile phone charging dock can be rotated 180° or 360°, which greatly facilitates the user to freely adjust an angle of the mobile phone during charging. Whether watching videos horizontally, making video calls, viewing messages vertically, or browsing web pages, the user can easily achieve this, greatly improving the convenience of use and meeting the diverse needs of the user for mobile phone usage angles in different scenarios. The watch charging dock can be opened and closed by rotating the shaft as a whole, rendering it convenient to place and use the watch, while protecting the watch charging interface. The earphone charging dock can be rotated outward by 90 degrees, rendering it easy to store and remove earphones. Especially when space is limited, this rotating design can better adapt to different usage scenarios and improve user convenience.

Personalized design meets charging needs and habits of different devices. Each charging dock is designed according to characteristics of different devices. The watch charging dock and earphone charging dock have recesses on outer shells for easy opening and use, which conforms to ergonomic principles and considers user habits. The mobile phone charging dock adopts wireless charging way, which reduces wear and tear of a mobile phone interface caused by plugging and unplugging the charging cable, thereby extending the service life of the mobile phone, and avoids a restraint of the charging cable, rendering it freer to use.

Optimizing charging experience and improving the charging efficiency and device lifespan. Wireless charging brings convenience to mobile phone charging, reduces physical damage to the mobile phone interface caused by plugging and unplugging operations, lowers a risk of poor interface contact, and extends the mobile phone's lifespan. Each charging dock is independently designed to avoid entanglement of charging cables, reduce charging failures caused by entanglement, improve charging stability and efficiency, render the charging process smoother for the user, and enhance an overall charging experience.

Numeral reference: 1 mobile phone charging dock; 11 lens; 12 magnet; 13 coil; 14 mobile phone charging outer shell; 15 PCB touch control chip; 16 turntable upper shell; 17 turntable lower shell; 18 turntable pressing piece; 19 motor; 2 watch charging dock; 21 watch module fixing piece; 22 watch module rotating shaft; 23 watch charging bottom cover; 24 watch charging outer shell; 25 watch coil; 3 earphone charging dock; 31 earphone module fixing piece; 32 earphone magnet; 33 earphone charging face cover; 34 earphone coil; 35 earphone charging outer shell; 4 common component; 41 middle shell; 42 middle shell decoration piece; 43 main PCB; 44 counterweight block; 45 light guide piece; 46 bottom cover; 47 rubber pad; 48 charging socket; 5 recess.

DESCRIPTION OF EMBODIMENTS

In order to facilitate the understanding of the present disclosure, a more comprehensive description of the present disclosure will be provided below with reference to relevant drawings. The preferred embodiment of the present disclosure is shown in the accompanying drawings. However, the present disclosure can be implemented in many different forms and is not limited to the embodiments described herein. On the contrary, the purpose of providing these embodiments is to provide a more thorough and comprehensive understanding of the disclosed content of the present disclosure.

It should be noted that when a component is referred to as "fixed to" another component, it can be directly on the other component or there can also be an intermediate component. When a component is "connected" to another component, it can be directly connected to another component or there may be an intermediate component present at the same time. On the contrary, when a component is referred to as "directly on" another component, there is no intermediate component. Terms "vertical", "horizontal", "left", "right" and similar expressions used in this specification are for an illustrative purpose only and do not represent the only implementation mode. Terms "upper", "lower", "left", "right", "front", "rear" and similar expressions used in this specification are based on the positional relationship of the reference figures.

Unless otherwise defined, all technical and scientific terms used in this specification have the same meanings as those commonly understood by those skilled in the art belonging to the present disclosure. Terms used in this specification of the present disclosure are only for a purpose of describing specific embodiments and are not intended to limit the present disclosure. The term "and/or" used in this specification includes any and all combinations of one or more related listed items.

Below, a further detailed explanation of the technical solution of the present disclosure will be provided in combination with specific implementation modes.

Figure 1:
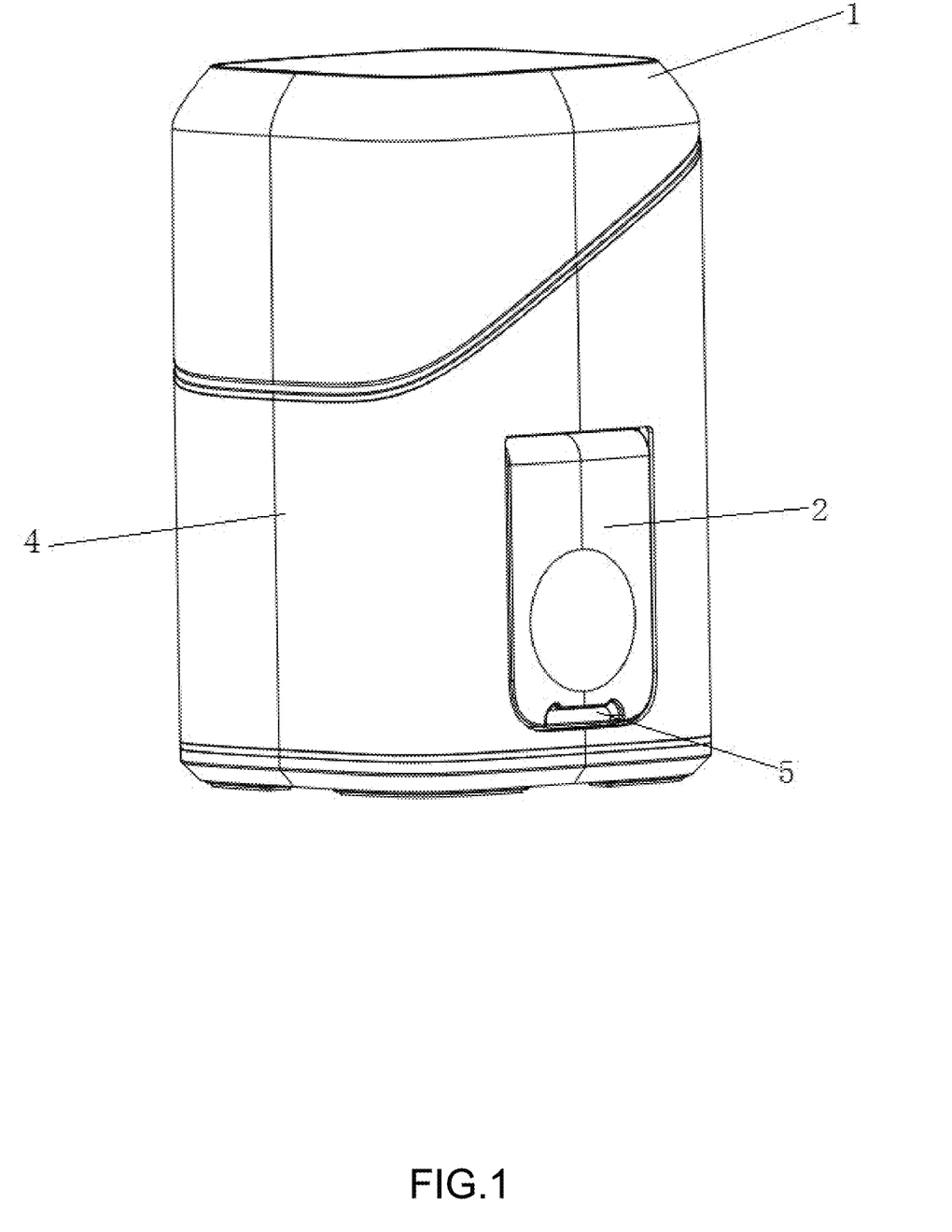
FIG. 1 is a first overall schematic diagram in an embodiment of the present disclosure.
Figure 2:
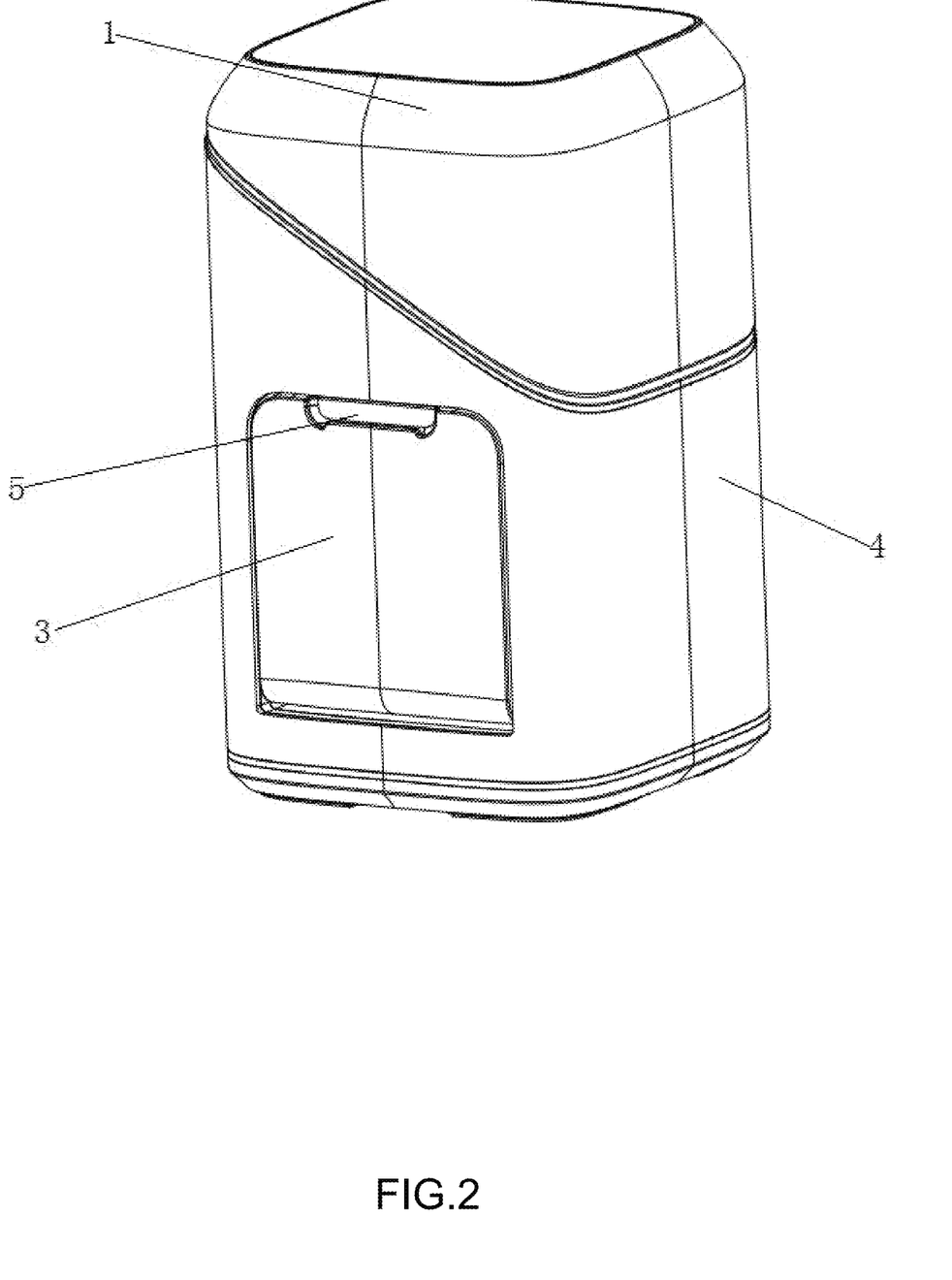
FIG. 2 is a second overall schematic diagram in an embodiment of the present disclosure.
Figure 3:
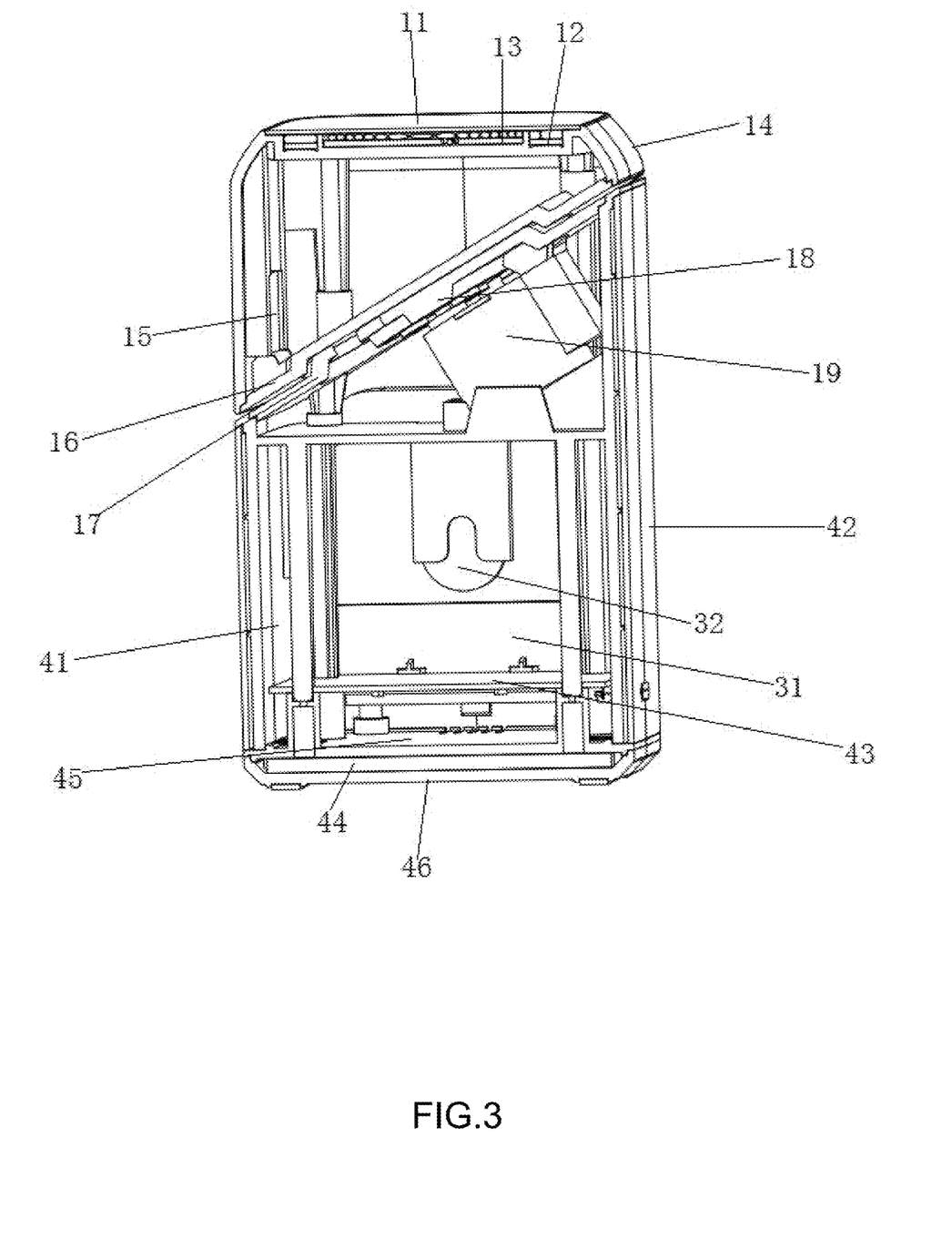
FIG. 3 is a first cross-sectional structural schematic diagram in an embodiment of the present disclosure.
Figure 4:
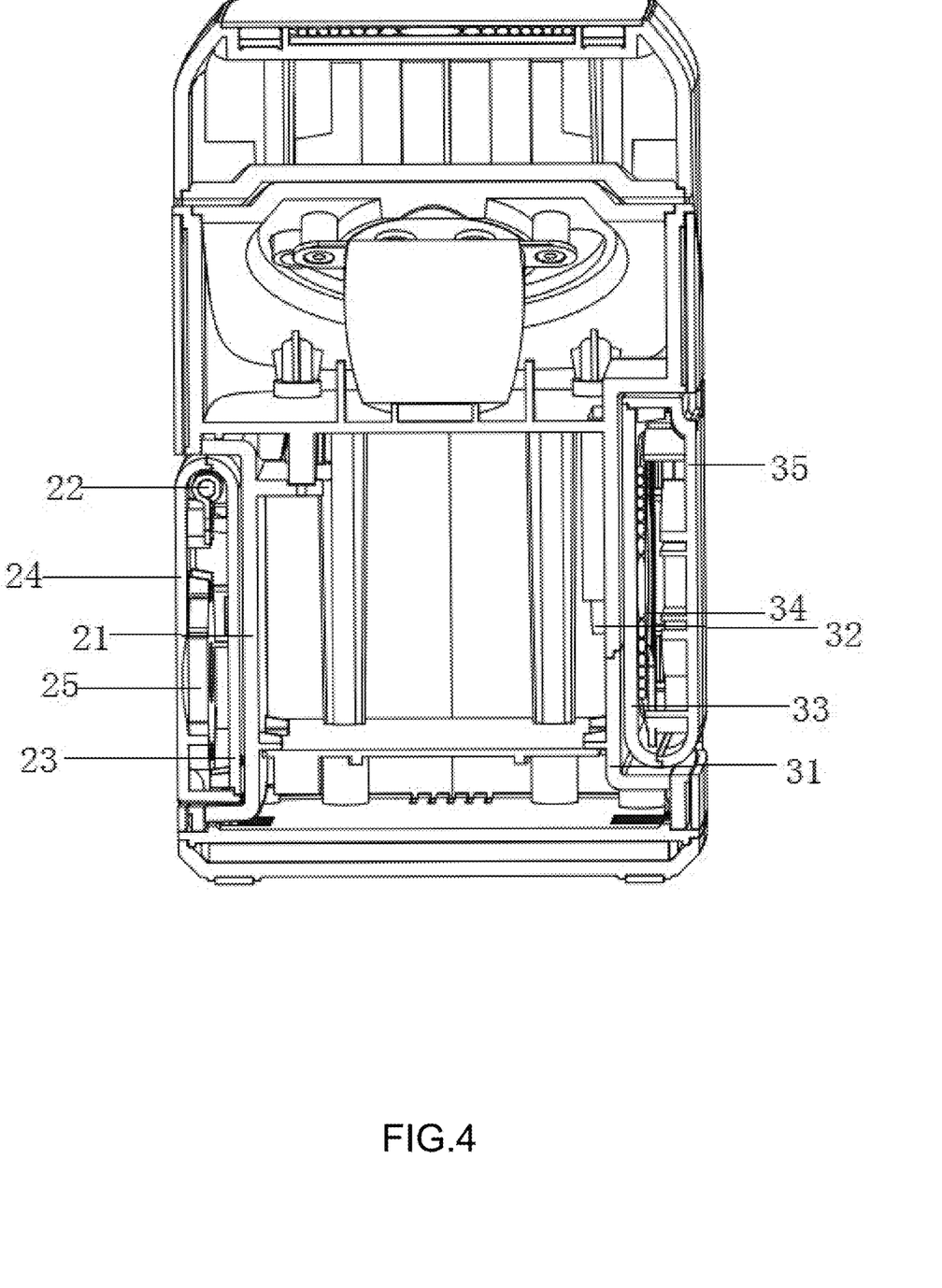
FIG. 4 is a second cross-sectional structural schematic diagram in an embodiment of the present disclosure.
Figure 5:
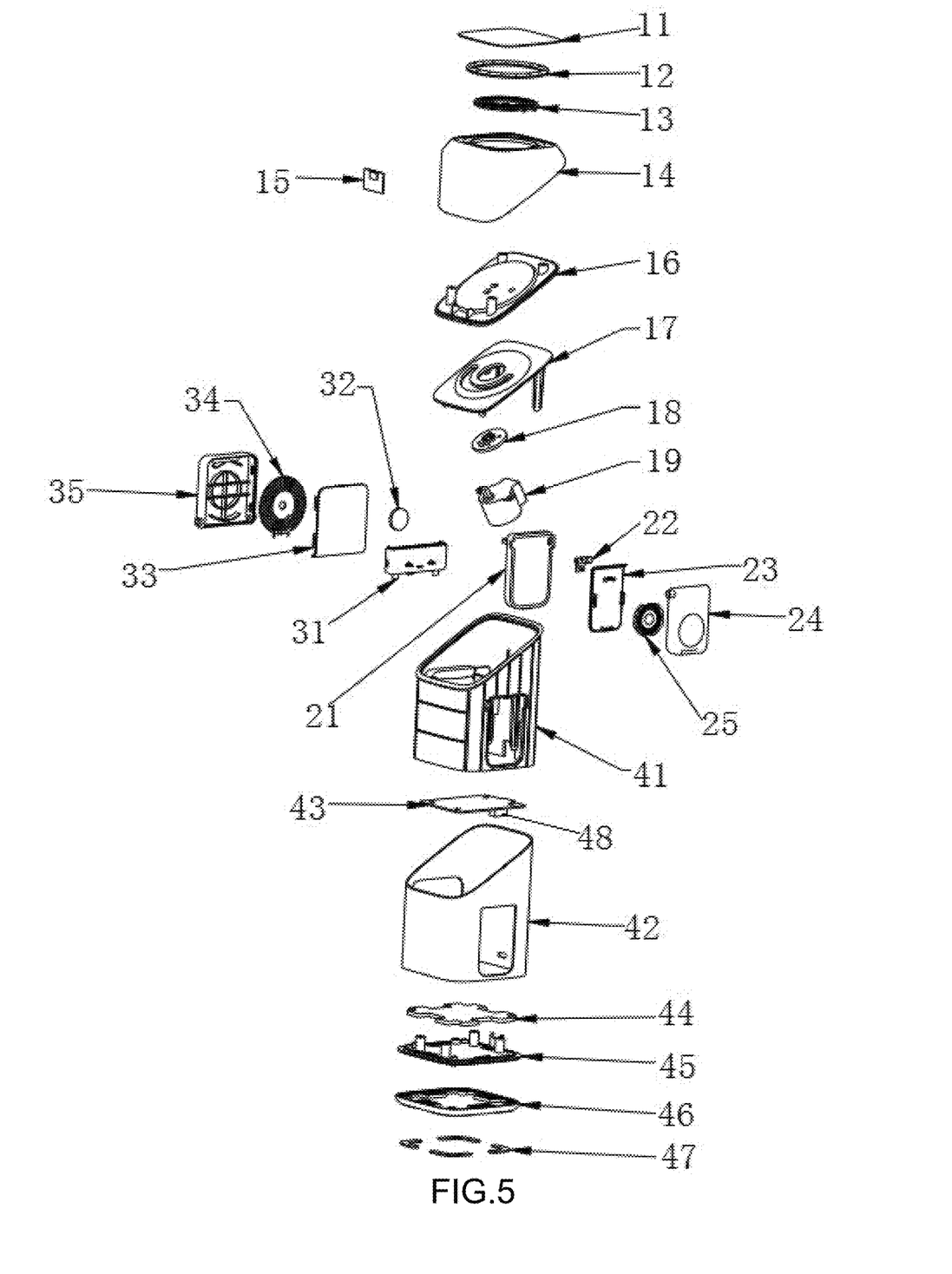
FIG. 5 is an exploded schematic diagram of an overall structure in an embodiment of the present disclosure.
Figure 6:
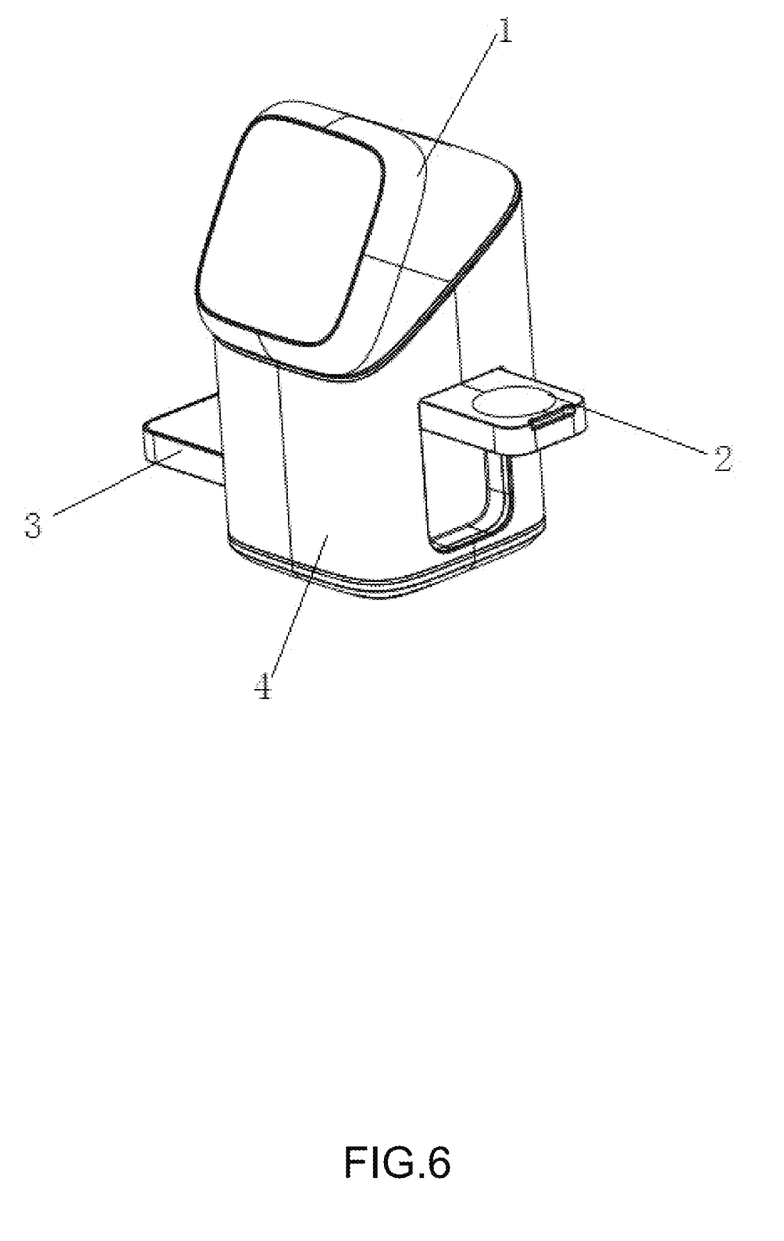
FIG. 6 is a first use state diagram in an embodiment of the present disclosure.
Figure 7:
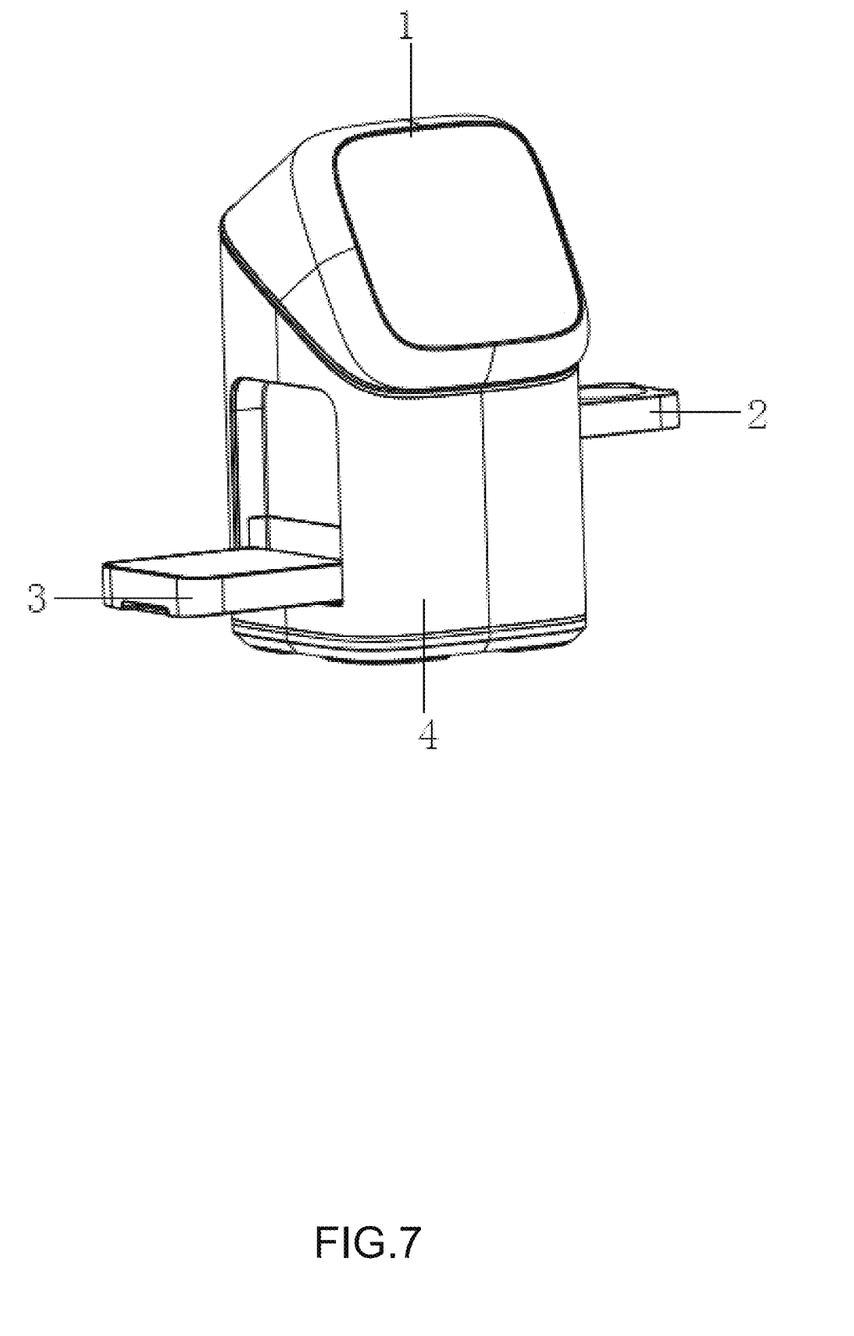
FIG. 7 is a second use state diagram in an embodiment of the present disclosure.

As shown in FIGS. 1-7, embodiments of the present disclosure provide a multifunctional and rotatable charging dock, which includes a mobile phone charging dock 1, a watch charging dock 2, an earphone charging dock 3, and a common component 4. The mobile phone charging dock 1 is provided on a top of the common component 4 and can be rotated 180° or 360° on the common component 4. The mobile phone charging dock 1 is configured to wireless charge a mobile phone. Left and right sides of the common component 4 are respectively provided with the watch charging dock 2 and the earphone charging dock 3. The watch charging dock 2 is configured to charge a watch, and the earphone charging dock 3 is configured to charge Bluetooth.

In this embodiment, the common component 4 includes a middle shell 41, a middle shell decoration piece 42, a main PCB 43, a counterweight block 44, a light guide piece 45, and a bottom cover 46. An outer side of the middle shell 41 is provided with the middle shell decoration piece 42; a bottom of the middle shell 41 is provided with the main PCB 43. The counterweight block is provided on the middle shell 41 through the light guide piece 45; an outer side of the counterweight block is connected to the bottom cover 46.

Left and right sides of the middle shell 41 are respectively connected to the earphone charging dock 3 and the watch charging dock 2.

In this embodiment, a rubber pad 47 is provided on the bottom cover 46.

In this embodiment, the mobile phone charging dock 1 includes a lens 11, a magnet 12, a coil 13, a mobile phone charging outer shell 14, a PCB touch control chip 15, a turntable upper shell 16, a turntable lower shell 17, a turntable pressing piece 18, and a motor 19. An interior of the mobile phone charging outer shell 14 is provided with the PCB touch control chip 15; a top of the mobile phone charging outer shell 14 is provided with the lens 11. The magnet 12 is provided between the lens 11 and the mobile phone charging outer shell 14, and the coil 13 is provided inside the magnet 12. A bottom plate of the mobile phone charging outer shell 14 is connected to the turntable upper shell 16; a center position of the turntable lower shell 17 is connected to the turntable pressing piece 18. The turntable lower shell 17 is connected to the turntable upper shell 16 through the turntable pressing piece 18; the turntable pressing piece 18 is connected to the motor 19. The motor 19 is configured to control the mobile phone charging dock 1 to rotate; the magnet 12 and the coil 13 are configured to charge the mobile phone.

In this embodiment, the watch charging dock 2 includes a watch module fixing piece 21, a watch module rotating shaft 22, a watch charging bottom cover 23, a watch charging outer shell 24, and a watch coil 25. The watch module fixing piece 21 is provided on a right side of the middle shell 41, and an outer side of the watch module fixing piece 21 is provided with the watch charging bottom cover 23. A left inner side of the watch module fixing piece 21 is provided with the watch module rotating shaft 22, and the watch module rotating shaft 22 passes through the watch module fixing piece 21 and is connected to the middle shell 41. The rotating shaft is configured for an overall rotation of the watch charging dock 2 to open and close. The watch charging bottom cover 23 is provided with the watch coil 25, and the watch coil 25 is configured to charge the watch. An outer side of the watch coil 25 is provided with the watch charging outer shell 24.

In this embodiment, the earphone charging dock 3 includes an earphone module fixing piece 31, an earphone magnet 32, an earphone charging face cover 33, an earphone coil 34, and an earphone charging outer shell 35. The earphone charging face cover 33 is provided on the light guide piece 45 through the earphone module fixing piece 31, and the earphone magnet 32 is provided on the middle shell 41. An outer side of the earphone charging face cover 33 is provided with the earphone coil 34, an outer side of the earphone coil 34 is provided with the earphone charging outer shell 35. The earphone charging face cover 33, the earphone coil 34, and the earphone charging outer shell 35 are integrated. The earphone charging face cover 33, the earphone coil 34, and the earphone charging outer shell 35 can be rotated outward by 90 degrees on the earphone module fixing piece 31.

In this embodiment, the earphone charging outer shell 35 and the watch charging outer shell 24 are provided with recesses 5, the recesses 5 are convenient to be opened and used.

In this embodiment, a charging socket 48 is further provided on the main PCB, and the charging socket 48 is configured to connect a charging cable.

Working Principle

Collaborative Work of an Overall Structure

The multifunctional and rotatable charging dock consists of the mobile phone charging dock 1, the watch charging dock 2, the earphone charging dock 3, and the common component 4. The common component 4 serves as a basic structure, its internal middle shell 41 provides installation positions for each charging dock, and the middle shell decorative piece 42 plays a decorative role. The main PCB43 is provided at the bottom of the middle shell 41 and is responsible for controlling circuit functions of the entire charging dock, such as power distribution, charging management, etc. The counterweight block 44 is provided on the middle shell 41 through the light guide piece 45, which can render a placement of the charging dock more stable. The light guide piece 45 may also have a certain light conduction function. The bottom cover 46 is connected to an outer side of the counterweight block 44; the rubber pad 47 on the bottom cover 46 plays a role in anti-slip and protecting the desktop. The charging socket 48 is configured to connect an external power source and provide power for the entire charging dock.

Working Principle of the Mobile Phone Charging Dock

The mobile phone charging dock 1 is located on the top of the common component 4, an internal PCB touch control chip 15 is responsible for receiving user operation instructions (such as touch control rotation angle, etc.) and communicating with the main PCB 43 to coordinate a charging process. The lens 11 is provided on the top of the mobile phone charging outer shell 14, which may serve to protect internal components and provide aesthetic decoration. The magnet 12 and the coil 13 are key components for wireless charging. When the mobile phone is placed on the mobile phone charging dock 1, the coil 13 generates a magnetic field through the principle of electromagnetic induction when current passes through and interacts with the induction coil inside the mobile phone, thereby achieving energy transmission to charge the mobile phone. The motor 19 is connected to the turntable pressing piece 18, and the turntable pressing piece 18 connects the turntable upper shell 16 and the turntable lower shell 17. When the motor 19 is working, it can drive the turntable upper shell 16 and the connected mobile phone charging outer shell 14 to rotate. A rotation angle can be 180° or 360°, rendering it convenient for a user to adjust a direction of the mobile phone. Whether using the mobile phone horizontally or vertically, it can maintain a charging state, thereby improving user convenience.

Working Principle of the Watch Charging Dock

The watch charging dock 2 is provided on the right side of the middle shell 41, and the watch module fixing piece 21 is configured to fix the position of the entire watch charging dock 2. The watch module rotating shaft 22 runs through the watch module fixing piece 21 and is connected to the middle shell 41. Through a rotating function of the shaft, a user can easily open or close the watch charging dock 2 as a whole. Thus, it is convenient to place and use the watch. At the same time, closing it when not in use can also protect the watch charging interface. The watch coil 25 provided on the watch charging bottom cover 23 is configured to cooperate with the charging interface or induction module of the watch. When the watch is placed on the watch charging bottom cover 23, the watch coil 25 and the charging components inside the watch transmit electrical energy through electromagnetic induction to charge the watch. The watch charging outer shell 24 plays a role in protecting the watch coil 25 and other internal components.

Working Principle of the Earphone Charging Dock

The earphone charging dock 3 is provided on the left side of the middle shell 41, the earphone charging face cover 33 is provided on the light guide piece 45 through the earphone module fixing piece 31, the earphone magnet 32 is installed on the middle shell 41; the earphone coil 34 on the outside of the earphone charging face cover 33 is used to charge the earphones. When the earphones are close to the earphone charging dock 3, electromagnetic induction is used to transfer electrical energy between the earphones and the earphone charging dock 3, which charges the earphone battery. The earphone charging face cover 33, the earphone coil 34, and the earphone charging outer shell 35 are integrated structures, which can rotate outward by 90 degrees on the earphone module fixing piece 31. This rotating design facilitates the storage and removal of earphones, especially in limited space. The users can flexibly adjust the position of the earphone charging dock 3 according to actual needs, rendering it convenient to use. The recesses 5 provided on the earphone charging outer shell 35 and the watch charging outer shell 24 are convenient for the user to insert and lift with fingers, it conforms the ergonomically and is easy to operate.

Rotation Principle

When the user issues a rotation command (such as through touch control, which is received by the PCB touch control chip 15), the motor 19 starts working.

The motor 19 drives the turntable pressing piece 18 to rotate. As the turntable lower shell 17 is connected to the turntable upper shell 16 through the turntable pressing piece 18, the turntable lower shell 17 remains relatively fixed (relative to the common component 4). A rotation of the turntable pressing piece 18 drives the turntable upper shell 16 and the mobile phone charging outer shell 14 connected above it to rotate.

By a precise control of the motor 19, the mobile phone charging dock can rotate 180° or 360° on the common component 4. For example, the motor 19 drives the turntable upper shell 16 and the mobile phone charging outer shell 14 to rotate 180° for half a turn, and 360° for one full turn. This rotating design allows the user to freely adjust the angle of the mobile phone while charging, whether watching videos horizontally, making video calls, viewing messages vertically, browsing web pages, etc., without changing the charging position of the mobile phone, thereby improving the convenience and flexibility of use and bringing the user a better charging experience.

The above embodiments are only used to illustrate the present disclosure and not to limit the present disclosure. Ordinary skilled persons in the relevant technical field can make various changes and modifications without departing from the spirit and scope of the present disclosure. Therefore, all equivalent technical solutions also belong to the scope of the present disclosure, and the protection scope of the present disclosure should be limited by the claims.

What is claimed is:

1. A multifunctional and rotatable charging dock, comprising a mobile phone charging dock, a watch charging dock, an earphone charging dock, and a common component;

wherein the mobile phone charging dock is provided on a top of the common component and is capable of being rotated 180° or 360° on the common component;

the mobile phone charging dock is configured to wireless charge a mobile phone;

left and right sides of the common component are respectively provided with the watch charging dock and the earphone charging dock;

the watch charging dock is configured to charge a watch, and the earphone charging dock is configured to charge earphones;

wherein the common component comprises a middle shell;

wherein the watch charging dock comprises a watch module fixing piece, a watch module rotating shaft, a watch charging bottom cover, a watch charging outer shell, and a watch coil;

the watch module rotating shaft passes through the watch module fixing piece and is connected to the middle shell; through a rotation of the watch module rotating shaft, the watch charging dock is opened or closed;

wherein the earphone charging dock comprises an earphone module fixing piece, an earphone magnet, an earphone charging face cover, an earphone coil, and an earphone charging outer shell;

the earphone magnet is provided on the middle shell;

the earphone charging face cover, the earphone coil, and the earphone charging outer shell are integrated.

2. The multifunctional and rotatable charging dock according to claim 1, wherein the common component further comprises a middle shell decoration piece, a main PCB, a counterweight block, a light guide piece, and a bottom cover;

an outer side of the middle shell is provided with the middle shell decoration piece, a bottom of the middle shell is provided with the main PCB, the counterweight block is provided on the middle shell through the light guide piece, an outer side of the counterweight block is connected to the bottom cover;

left and right sides of the middle shell are respectively connected to the earphone charging dock and the watch charging dock.

3. The multifunctional and rotatable charging dock according to claim 2, wherein a rubber pad is further provided on the bottom cover.

4. The multifunctional and rotatable charging dock according to claim 3, wherein the mobile phone charging dock comprises a lens, a magnet, a coil, a mobile phone charging outer shell, a PCB touch control chip, a turntable upper shell, a turntable lower shell, a turntable pressing piece, and a motor;

the PCB touch control chip is provided inside the mobile phone charging outer shell, and the lens is provided on a top of the mobile phone charging outer shell;

the magnet is provided between the lens and the mobile phone charging outer shell, and the coil is provided inside the magnet;

a bottom plate of the mobile phone charging outer shell is connected to the turntable upper shell, a center position of the turntable lower shell is connected to the turntable pressing piece;

the turntable lower shell is connected to the turntable upper shell through the turntable pressing piece;

the turntable pressing piece is connected to the motor, and the motor is configured to control the mobile phone charging dock to rotate;

the magnet and the coil are configured to charge the mobile phone.

5. The multifunctional and rotatable charging dock according to claim 4, wherein the watch module fixing piece is provided on a right side of the middle shell, the watch charging bottom cover is provided on an outer side of the watch module fixing piece, and the watch module rotating shaft is provided on a left inner side of the watch module fixing piece, the watch coil is provided on the watch charging bottom cover, and the watch coil is configured to charge the watch;

an outer side of the watch coil is provided with the watch charging outer shell.

6. The multifunctional and rotatable charging dock according to claim 5, wherein the earphone charging face cover is provided on the light guide piece through the earphone module fixing piece;

an outer side of the earphone charging face cover is provided with the earphone coil, and an outer side of the earphone coil is provided with the earphone charging outer shell;

the earphone charging face cover, the earphone coil, and the earphone charging outer shell are capable of being rotated outward 90 degrees on the earphone module fixing piece.

7. The multifunctional and rotatable charging dock according to claim 6, wherein the earphone charging outer shell and the watch charging outer shell are provided with recesses, and the recesses are convenient to be opened and used.

8. The multifunctional and rotatable charging dock according to claim 7, wherein a charging socket is further provided on the main PCB, and the charging socket is configured to connect a charging cable.

* * * * *